United States Patent [19]

Uenishi et al.

[11] Patent Number: 5,624,561
[45] Date of Patent: Apr. 29, 1997

[54] CELLULOSE ACETATE HEMODIALYSIS MEMBRANE

[75] Inventors: Tohru Uenishi; Isamu Yamamoto; Kazutake Okamoto; Hideo Sato; Yasuhiro Shiota; Hidehiko Sakurai; Seiji Watanuki; Mitsuru Suzuki, all of Otsu, Japan

[73] Assignee: Toyo Boseki Kabushiki Kaisha, Osaka, Japan

[21] Appl. No.: 272,397

[22] Filed: Jul. 26, 1994

[30] Foreign Application Priority Data

| Jul. 28, 1993 | [JP] | Japan | 5-186336 |
| Aug. 12, 1993 | [JP] | Japan | 5-200851 |
| Aug. 20, 1993 | [JP] | Japan | 5-206013 |

[51] Int. Cl.$^6$ ........................... B01D 39/00
[52] U.S. Cl. ................ 210/500.32; 210/500.29; 210/500.3; 210/500.31; 210/321.71
[58] Field of Search ............... 210/655, 500.29, 210/500.13, 500.31, 500.32, 321.71; 264/49, 41; 106/122

[56] References Cited

U.S. PATENT DOCUMENTS

| 4,147,622 | 4/1979 | Nussbaumer et al. | 210/655 |
| 4,171,987 | 10/1979 | Horiguchi et al. | 106/122 |
| 4,234,528 | 11/1980 | Nussbaumer et al. | 210/500.31 |
| 4,253,963 | 3/1981 | Franken et al. | 210/500.31 |
| 4,276,173 | 6/1981 | Kell et al. | 210/500.23 |
| 4,340,428 | 7/1982 | Boeddeker et al. | 264/41 |
| 4,543,221 | 9/1985 | Chen et al. | 210/500.3 |
| 4,681,713 | 7/1987 | Miyagi et al. | 210/500.31 |
| 4,980,063 | 12/1990 | Mahoney et al. | 210/500.23 |
| 5,211,849 | 5/1993 | Kithavich et al. | 210/321.71 |

FOREIGN PATENT DOCUMENTS

| 2816086 | 10/1979 | Germany. | |
| 2820265 | 11/1979 | Germany. | |
| 51-83084 | 7/1976 | Japan | 210/500.1 |
| 57-042918 | 3/1982 | Japan. | |
| 57-042740 | 3/1982 | Japan. | |
| 05228208 | 9/1993 | Japan. | |

*Primary Examiner*—Ana Fortuna
*Attorney, Agent, or Firm*—Foley & Lardner

[57] ABSTRACT

A cellulose acetate membrane composed of a mixture comprising a cellulose triacetate and a cellulose diacetate and having an improved heat stability, which does not substantially show a melting peak of cellulose diacetate but substantially shows a melting peak of cellulose triacetate, in a differential thermal analysis. By mixing a cellulose triacetate and a cellulose diacetate at an appropriate ratio, crystallization or orientational crystallization of each component due to a high pressure steam sterilization can be avoided and a cellulose acetate membrane with improved water permeability and sieving coefficient of myoglobin after a high pressure steam sterilization can be obtained.

18 Claims, 4 Drawing Sheets

CELLULOSE ACETATE HEMODIALYSIS MEMBRANE

FIELD OF THE INVENTION

The present invention relates to a separating membrane with an improved heat resistance. More particularly, the present invention relates to a cellulose acetate membrane permitting high pressure steam sterilization, a method for producing the membrane and to a hemodialyzer using said membrane.

BACKGROUND OF THE INVENTION

A cellulose acetate superior in the balance of hydrophilicity and hydrophobicity has been widely used for industrial purposes as a gas separation membrane, a reversed semipermeable membrane, an ultrafiltration membrane, a precision filtration membrane or the like, as well as a hemodialysis membrane to be used for an artificial kidney (hemodialyzer). When a cellulose triacetate membrane or a cellulose diacetate membrane is used for a hemodialyzer as a hollow fiber membrane for hemodialysis, however, high pressure steam sterilization (e.g. at 120° C. for 20 min) causes deterioration by heat and structural change due to crystallization and orientational crystallization, so that water permeability and permeation of solute are markedly impaired to prohibit application of the high pressure steam sterilization to cellulose acetate membrane.

SUMMARY OF THE INVENTION

An object of the present invention is to provide a membrane which does not suffer from such conventional defect, namely, a cellulose acetate membrane improved in heat stability to allow high pressure steam sterilization.

Another object of the present invention is to provide a method for producing said cellulose acetate membrane.

A still another object of the present invention is to provide a hemodialyzer using said cellulose acetate membrane.

According to the present invention, there is provided a cellulose acetate membrane composed of a mixture comprising a cellulose triacetate and a cellulose diacetate and having an improved heat stability, which does not substantially show a melting peak of cellulose diacetate but substantially shows a melting peak of cellulose triacetate, in a differential thermal analysis.

DETAILED DESCRIPTION OF THE INVENTION

The cellulose acetate hemodialysis membrane, particularly a cellulose acetate hollow fiber for hemodialysis of the present invention is manufactured from a mixture of two or more kinds of cellulose acetates respectively having a different average combined acetic acid content of at least 52%, particularly from a mixture of a cellulose diacetate (CDA) and a cellulose triacetate (CTA). The present invention enables inhibiting structural change of a porous body, namely, reducing the shrinking of pore diameters to a minimum possible degree or rather, enlarging the diameters upon high pressure steam treatment, which is the effect of mixing cellulose acetates having different combined acetic acid contents. That is, a cellulose acetate having a low combined acetic acid content, specifically CDA, extends to the longitudinal direction due to the orientational crystallization caused by the heat treatment and a cellulose acetate having a high combined acetic acid content, specifically CTA, shrinks to the longitudinal and radial directions due to the crystallization caused by the heat treatment, thus compensating different properties of the two cellulose acetates by CDA suppressing the shrinkage due to the crystallization of CTA and CTA suppressing the extension due to the orientation of CDA.

By mixing cellulose acetates respectively having a different average combined acetic acid content, for example, CDA and CTA, moreover, the heat resistance of the cellulose acetate membrane obtained from said mixture can be improved.

Figure 1:
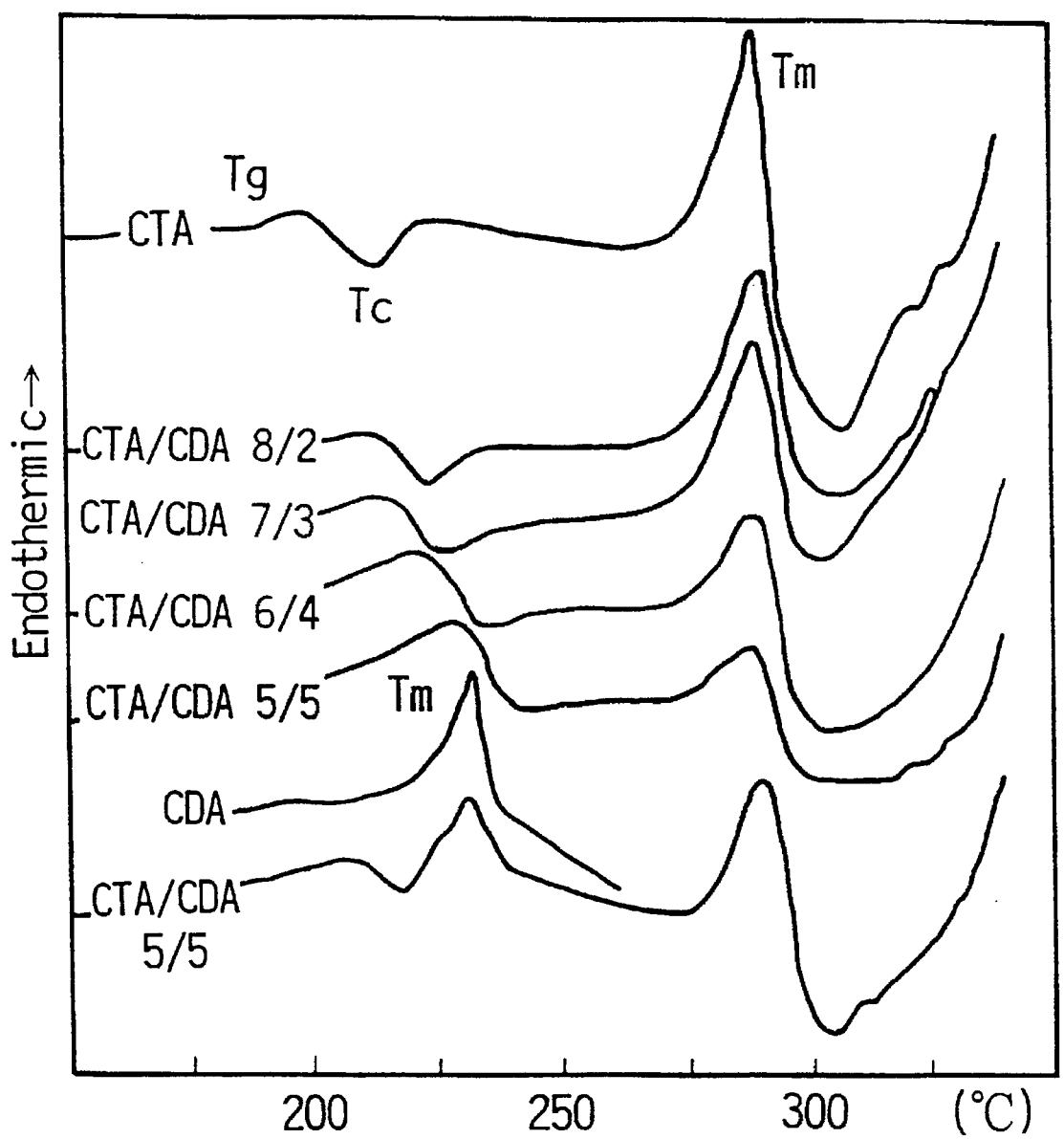
FIG. 1 shows the results of differential thermal analysis of cellulose acetate membranes.

FIG. 1 is a chart showing the differential thermal analysis results of hollow fibers obtained from CDA alone, CTA alone, and various mixtures of CDA and CTA at diverse mixing ratios, which are the results of the experiments to be described later in Examples. In FIG. 1, Tg is glass transition temperature (°C.), Tm is melting temperature (°C.) and Tc is temperature of crystallization by cooling (°C).

The results indicate that the membrane of the present invention prepared from a mixture comprising CDA and CTA does not have a melting peak which is found in the case of a membrane made from CDA alone, but substantially retains a melting peak which is found in the case of a membrane made from CTA alone, and that the temperature of crystallization by cooling which is found in the case of a membrane made from CTA alone shifts to the side of higher degrees, suggesting an improved heat resistance.

The cellulose acetate hemodialysis membrane of the present invention is manufactured from a mixture of at least two kinds of cellulose acetates (which are preferably prepared independently) having different average combined acetic acid contents calculated by the following formula, which are at least 52%. Specifically, a cellulose acetate membrane obtained from a mixture comprising a CDA having a combined acetic acid content of 52–58%, preferably 54–56% and a CTA having a combined acetic acid content of 60–62%, preferably 60.5–61.5% is desirable.

$$\text{Combined acetic acid content (\%)} = \frac{\text{mass of acetyl group converted to acetic acid}}{\text{total mass of cellulose acetate}} \times 100$$

For example, a cellulose acetate having 50% combined acetic acid content is generally produced by hydrolysis of a CTA having 62% combined acetic acid content. Accordingly, the combined acetic acid content in "a cellulose acetate having 50% combined acetic acid content" means an average combined acetic acid content and said cellulose acetate is a mixture inclusive of small amounts of a cellulose acetate which is more than 50% in the combined acetic acid content and a cellulose acetate which is less than 50% in the combined acetic acid content.

In the same manner, a CDA having a combined acetic acid content of 52–58% or a CTA having a combined acetic acid content of 60–62% means a mixture having an average combined acetic acid content of 52–58% or 60–62%.

Water permeability, sieving coefficient and permeation coefficient of solute as used in the present specification are defined as follows.

Water permeability (ml/m² hr mmHg)=V/(A·P·T) wherein V is permeated water (ml), A is filter area (m²), P is pressure (mmHg) and T is time (hr).

Sieving coefficient=2Cf/(Ci+Co) wherein Cf is a concentration of protein in a dialyzing fluid after dialysis, Ci is a concentration of protein in blood before dialysis and Co is a concentration of protein in blood after dialysis.

Permeation coefficient of solute ($\times 10^{-5}$ cm/sec)

$$=Qb/A\times \ln(C1/C2)$$

wherein Qb is blood flow rate (ml/min), A is filter area (cm²), C1 is concentration of solute at an inlet and C2 is a concentration of solute at a delivery end.

The membrane properties were determined according to the method of Klein et al [Journal of Membrane Science, vol. 1, p 371–396 (1976)].

The porocity indicating the ratio of the fine pores to the membrane volume is determined by the following formula.

$$\frac{\text{Weight of membrane swollen* with water} - \text{Weight of dry membrane}}{\text{Weight of dry membrane}} \times 100$$

Note*: A water-wetted membrane is gently dehydrated to drain excess amount of water and leave water in pores only.

The diameter of the fine pores in the membrane wall is calculated by the following formula.

$$\text{Diameter (}\mu\text{m)} = 1.080 \times 10^{-4} \sqrt{\frac{UFR \cdot L}{Po}} \times 2$$

wherein UFR is water permeability as defined above, L is thickness of membrane wall and Po is porocity as defined above divided by 100.

The combined acetic acid content of the mixture forming the membrane is 56–61.5%.

The mixing ratio of CTA and CDA is CTA/CDA=99/1–50/50 by weight, preferably CTA/CDA=95/5–50/50 by weight, more preferably CTA/CDA=95/5–55/45 by weight, and most preferably CTA/CDA=90/10–50/50 by weight (58–61.9% as the combined acetic acid content of the mixture), particularly preferably CTA/CDA=90/10–70/30 by weight (61.2–61.9% as the combined acetic acid content of the mixture).

The cellulose acetate hemodialysis membrane of the present invention may be a plane membrane or a hollow fiber, with preference given to hollow fiber. The present invention is described hereunder referring to the hollow fiber.

The hollow fiber of the present invention is preferably a porous hollow fiber having an outer diameter of 180–320 μm, more preferably 200–260 μm, an inner diameter of 150–250 μm, more preferably 170–230 μm, and fiber thickness of 10–50 μm, and fine pores of 20–300Å, more preferably 30–200 Å and most preferably 40–100 Å, in diameter in the membrane wall at a porocity of 50–90%, more preferably 60–85%.

The cellulose acetate hemodialysis hollow fiber of the present invention does not suffer from degradated water permeability and decreased permeation of substances even upon high pressure steam treatment. That is, the diameter of the fine pores in the fiber wall does not become smaller but rather grows, so that the water permeability and permeation of substances before the high pressure steam treatment can be retained.

Specifically stated, the ratio of water permeability after a high pressure (ca. 1.3 atm) steam treatment at 121° C. for 20 minutes to that before the treatment is preferably not less than 0.9, more preferably not less than 1.0, and most preferably not less than 1.1 and the ratio of the sieving coefficient of myoglobin before the high pressure steam treatment to that after the treatment is preferably not less than 0.9, more preferably not less than 1.0 and most preferably not less than 1.1. The permeation coefficient of urea after the high pressure heat treatment to that before the treatment is not less than 0.65, preferably not less than 0.7, and more preferably not less than 0.75. A cellulose acetate membrane having a porocity of 50–90%, preferably 60–85% is desirable.

It is important that CTA and CDA be compatible in the cellulose acetate mixture of the present invention. For this end, a CTA and a CDA are once dissolved in a solvent and then subjected to forming. Preferable solvent is a non-protonic polar solvent which is exemplified by N-methylpyrrolidone, dimethylformamide, dimethylacetamide and dimethylsulfoxide. A CTA and a CDA are dissolved in a non-polar solvent having a boiling point of not less than 150° C., which has been added with a non-solvent substance such as polyhydric alcohol (e.g. ethylene glycol, triethylene glycol, polyethylene glycol, glycerine, polypropylene glycol) and alcohol (e.g. methanol, ethanol) to a concentration of 10–40% by weight to give a dope. The dope is then extruded into a coagulating bath containing an aqueous solution containing the above-mentioned solvent and the non-solvent substance, through a spinneret, a tube-in-orifice spinneret when a hollow fiber is desired, to form a hollow fiber. The mixing ratio of solvent/non-solvent is suitably 50/50–90/10 by weight. Extrusion of the dope from the spinneret into the coagulating bath may be done by a wet spinning including direct extrusion of the dope into a coagulating bath or an air gap spinning wherein an air gap is formed between the spinneret and the coagulating bath surface and the dope is extruded once into the air from the spinneret and then introduced into the coagulating bath. A high permeation property can be achieved when the discharge temperature ($T_1$) and the temperature of the coagulating bath ($T_2$) are set to satisfy $0<T_1-T_2<100$ (°C.).

While it is also possible to flow a liquid such as liquid paraffin inside the hollow fiber when discharging the dope from the spinneret when a hollow fiber is formed with the use of a tube-in-orifice spinneret, an adequate amount of a gas, particularly an inert gas, is preferably flown inside the hollow fiber in the present invention.

Figure 2:
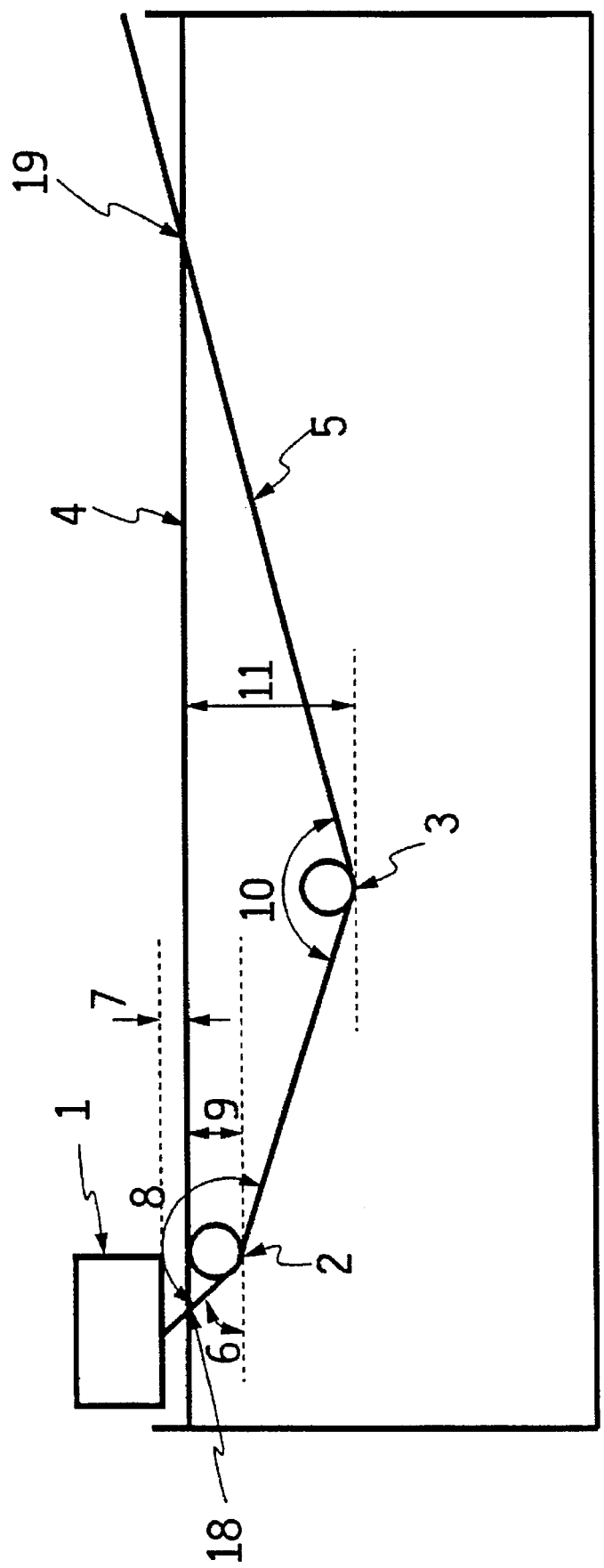
FIG. 2 shows one embodiment of the present invention, which is a schematic presentation of the process with the use of two round rod guides in Example 8.
Figure 3:
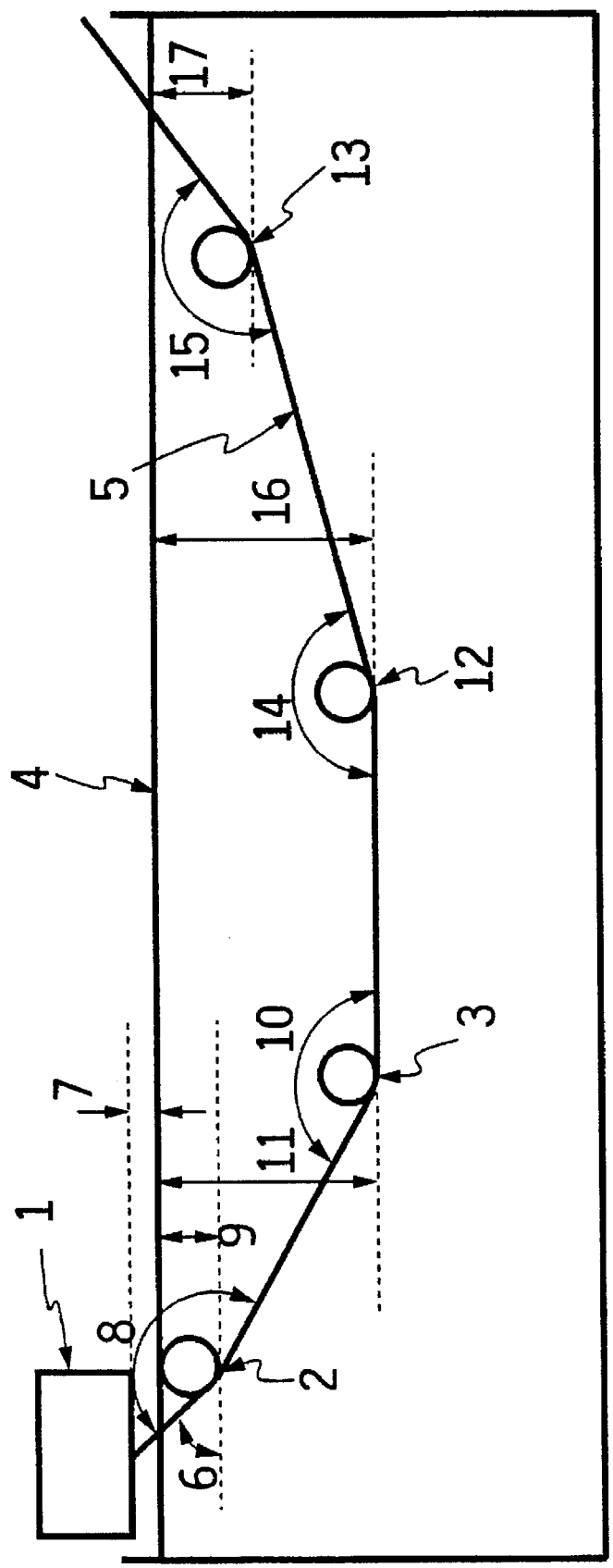
FIG. 3 shows another embodiment of the present invention, which is a schematic presentation of the process with the use of four round rod guides in Example 9.
Figure 4:
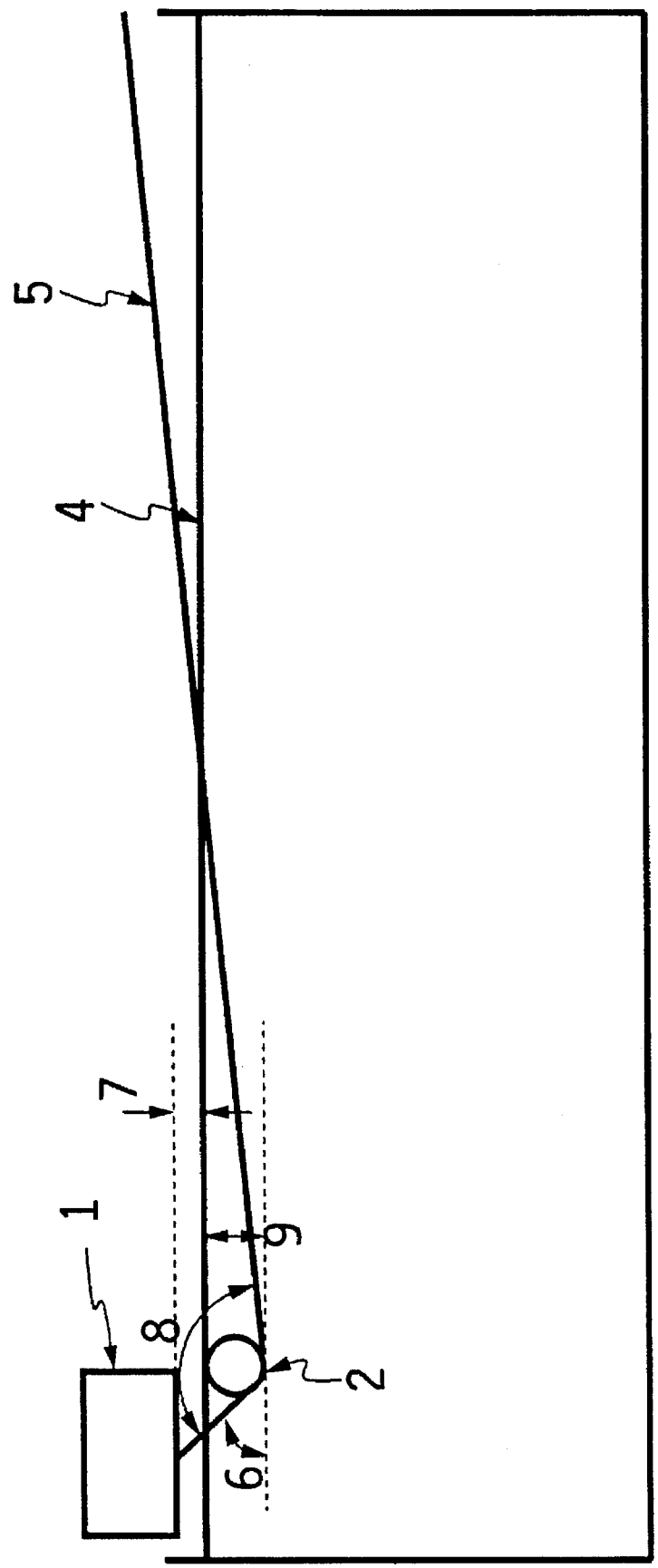
FIG. 4 shows a still another embodiment of the present invention, which is a schematic presentation of the process with the use of one round rod guides in Example 10 and Example 11.

When spinning the hollow fiber while using a gas as a core, the angle [(6) in FIGS. 2, 3 and 4] formed by the hollow fiber discharged from the spinneret and the surface of the coagulating liquid is preferably not more than 90°.

It is also preferable to form one or plural guides in the coagulating bath to change the moving direction of the hollow fiber so that the hollow fiber will not take a sharp angle in the coagulating bath. By this method, the follow fiber crush developed when a gas is used as a core fluid can be avoided and an almost round hollow fiber can be obtained.

The gas used for forming a hollow part is not subject to any particular limitation insofar as it is a gas at normal temperature under normal pressure and air, nitrogen, oxygen, carbon dioxide, rare gas such as argon and a mixture of these may be used. From the aspect of cost and solubility, air and nitrogen are preferred.

The guide may be formed from Teflon, Bakelite, stainless or stainless coated with Teflon, silicon or hard chromium. In view of durability, stainless coated with hard chromium with satin finish is preferred. The material of the guide is not limited to the above-mentioned.

The guide may be a fixed guide or a rotary guide in interlock with the progress of the hollow fiber. The rotary guide with a great rotation number preferably has a device (e.g. a threshold between the point the hollow fiber enters a coagulating liquid and a first guide) to avoid waving of the surface of the coagulating liquid. While the shape of the guide is not particularly limited, the contact portion with the hollow fiber is preferably a smooth curve so as to reduce the force in the direction of crushing the hollow fiber by contact pressure and friction. A preferred shape is a round rod.

The number of the guide is not particularly limited. The guide may be such where plural guides are connected and fixed into one guide.

The guide(s) in the present invention is(are) not necessarily soaked entirely in the coagulating liquid in the coagulating bath and the contact part of the hollow fiber and only the guide needs to be soaked in the coagulating liquid.

In addition, the position of the guide(s) in the coagulating bath is not particularly limited and may be set depending on the coagulating speed of the spinning dope in such a manner that enables forming of a desired angle of the hollow fiber before and after each guide.

In the present invention, the moving direction of the hollow fiber is changed by bringing the hollow fiber into contact with the guide and letting the fiber move along a part of the periphery of the guide until it reaches the desired direction, along which the fiber is made to proceed thereafter.

The hollow fiber here includes those incompletely coagulated after insertion through the surface of the coagulating liquid in the coagulating bath until they form hollow fibers by complete coagulation.

The spinneret in the present invention may be any inclusive of all the spinnerets used for dry-wet spinning, such as a so-called tube-in-orifice spinneret and a three holes tube-in-orifice spinneret.

The "downwardly discharged" in the present invention does not mean perpendicular discharge and only needs to be downward below the horizontal direction.

The hemodialysis membrane of the present invention is housed in a container having an inlet and an outlet and assembled into a hemodialyzer to depurate the blood, and the hemodialyzer is subjected to a known high pressure steam sterilization at preferably 80°–140° C. When the temperature is not more than 80° C., sterilization is not complete, while when it is not less than 140° C., the property of the hollow fiber becomes poor and the parts used for assembling the dialyzer are deteriorated to the point a practical dialyzer cannot be manufactured. For these reasons, it is preferable that the hemodialyzer of the present invention be sterilized at a temperature of from 80° C. to 140° C. Particularly desirable steam sterilization is done at 115° C. for 30 minutes, at 121° C. for 20 minutes or 126° C. for 15 minutes.

For use at a temperature near 80° C., the container housing the membrane of the present invention is made from styrene-acrylonitrile copolymer and at a higher temperature, polycarbonate or poly-4-methylpentene-1 polymer.

A sterilized hemodialyzer produced according to the present invention is sterile and is free of residual toxicity. Aided by the sufficiently high dialyzing capability, the hemodialyzer using the membrane of the present invention can exert beneficial effects in artificial dialysis.

In particular, a hemodialyzer comprising a hollow fiber composed of a homogeneous mixture of CTA and CDA, the CDA being contained at a proportion of 1–50% by weight of CTA and CDA, which shows the sieving coefficient of albumin after a high pressure steam treatment at 121° C. for 20 minutes of not more than 0.1 and the sieving coefficient of myoglobin after the treatment of not less than 0.1, the fiber being housed in a container having an inlet and an outlet, is preferable.

The hemodialyzer of the present invention is not limited for use for an artificial kidney and sufficiently applied to an artificial lung, an artificial liver, an artificial pancreas or the like.

The present invention is described in detail by way of Examples and Comparative Examples in the following.

EXAMPLE 1

A mixture of a CTA, 60.8% in the combined acetic acid content, and a CDA, 55.0% in the combined acetic acid content, mixed at a weight ratio of 8/2 (19% by weight), N-methylpyrrolidone (64.8% by weight) and ethylene glycol (16.2% by weight) were mixed to give a dope. The dope was discharged into a coagulating liquid of an aqueous solution of N-methylpyrrolidone 32% by weight and triethylene glycol 8% by weight from a tube-in-orifice spinneret while using an inert gas as an inside fluid. The subsequent water bath and glycerine bath gave a hollow fiber. The discharge temperature was 120° C. and coagulating bath temperature was 35° C. The obtained hollow fiber was round and had an outer diameter of about 250 µm and a membrane thickness of about 20 µm.

After a hundred hollow fibers of about 5 cm long were swollen with water, the water was displaced in a mixed solvent of isopropyl alcohol/cyclohexane at a weight ratio of 100/0, 75/25, 50/50, 25/75 and 0/100 sequentially under ice-cooling. The fibers were dried under reduced pressure overnight and freeze-pulverized with liquid nitrogen. The pulverization product (ca. 10 mg) was packed in an aluminum pan for differential scanning calorimetry (DSC) determination and subjected to differential thermal analysis with the use of DSC-7 (manufactured by Perkin-Elmer) under a nitrogen atmosphere at a temperature of from 30° C. to 350° C. and at a temperature elevating rate of 20° C./min. The results are shown in Table 1 and FIG. 1.

The dyalysis capability was evaluated as follows. A hundred and twenty 25 cm-long hollow fibers were bundled and adhered to an acrylic resin pipe with an urethane adhesive to give a mini-module for testing. The mini-module was autoclaved at 121° C. for 20 minutes under ca. 1.3 atm. With regard to water permeability, the mini-module was also used for the determination. That is, pure water maintained at 37° C. was passed through the blood side. According to the method of Klein et al, the stream was stopped and the pressure of 150 mmHg was applied thereon. The decreased amount of the pure water in a burette connected to the mini-module and the time were measured to determine the amount of the permeated water. The sieving coefficient of myoglobin was determined as follows. An aqueous solution of myoglobin was placed in a box kept at 37° C., applied with the pressure of 100 mmHg, and was passed through the blood side of the mini-module at 20 ml/min. The myoglobin concentrations at an outlet, an inlet and in a dialyzing fluid after dialysis were measured, based on which the sieving coefficient was calculated. The permeation coefficient of urea was also determined by the use of the above-mentioned mini-module. A solution of urea (5 g/l) was flown through the blood side at 17 ml/min (Qb) and dialyzing fluid (pure water, 400 ml) was passed through the dialysis side at 2 l/min. The dialyzing fluid was constantly stirred and kept at 400 ml volume. The dialyzing fluid was partially substituted by pure water at 2 l/min. The water permeability and the sieving coefficient of myoglobin before and after the high pressure (ca. 1.3 atm) steam sterilization at 121° C. for 20 minutes are shown in Table 2. As is evident from Table 2, the water permeability and the sieving coefficient of myoglobin showed improvement after the high pressure steam sterilization.

EXAMPLE 2

The same mixture of CTA and CDA as in Example 1 was used at a weight ratio of 7/3 under the same conditions as in Example 1 to produce a hollow fiber to be subjected to differential thermal analysis. The results are shown in Table 1 and FIG. 1. Water permeability and sieving coefficient of myoglobin after the high pressure steam sterilization are shown in Table 2. As is evident from Table 2, < the water permeation and the sieving coefficient of myoglobin showed improvement after the high pressure steam sterilization.

EXAMPLE 3

The same mixture of CTA and CDA as in Example 1 was used at a weight ratio of 6/4 under the same conditions as in Example 1 to produce a hollow fiber to be subjected to differential thermal analysis. The results are shown in Table 1 and FIG. 1. Water permeability and sieving coefficient of myoglobin after the high pressure steam sterilization are shown in Table 2. As is evident from Table 2, the water permeability and the sieving coefficient of myoglobin showed improvement after the high pressure steam sterilization.

EXAMPLE 4

The same mixture of CTA and CDA as in Example 1 was used at a weight ratio of 5/5 under the same conditions as in Example 1 to produce hollow fibers to be subjected to differential thermal analysis. The results are shown in Table 1 and FIG. 1. Water permeability and sieving coefficient of myoglobin after the high pressure steam sterilization are shown in Table 2. As is evident from Table 2, the water permeability and the sieving coefficient of myoglobin showed improvement after the high pressure steam sterilization.

COMPARATIVE EXAMPLE 1

ACTA membrane was subjected to differential thermal analysis. The results are shown in Table 1 and FIG. 1. Water permeability and sieving coefficient of myoglobin before and after the high pressure steam sterilization are shown in Table 2. As is evident from Table 2, the water permeability and the sieving coefficient of myoglobin became drastically poor after the high pressure steam sterilization as compared with the initial properties and the membrane was not practically usable.

COMPARATIVE EXAMPLE 2

A CDA membrane was subjected to differential thermal analysis. The results are shown in Table 1 and FIG. 1. Water permeability and sieving coefficient of myoglobin before and after the high pressure steam sterilization are shown in Table 2. As is evident from Table 2, the water permeability and the sieving coefficient of myoglobin became drastically poor after the high pressure steam sterilization as compared with the initial properties, and the membrane was not practically usable.

COMPARATIVE EXAMPLE 3

A mixture of the freeze-pulverized CTA membrane and CDA membrane (1/1 by weight) was subjected to differential thermal analysis. The differential thermal analysis of a merely freeze-pulverized mixture resulted in a combination of the respective peaks of the components. The results are shown in Table 1 and FIG. 1.

TABLE 1

Temperature of crystallization by cooling and melting point of cellulose acetate membrane

| | CTA/CDA ratio | Tc (°C.) | Tm (°C.) |
| --- | --- | --- | --- |
| Example 1 | 80/20 | 221.6 | 289.8 |
| Example 2 | 70/30 | 227.2 | 289.8 |
| Example 3 | 60/40 | 236.0 | 289.7 |
| Example 4 | 50/50 | 245.0 | 289.2 |
| Comp. Ex. 1 | 100/0 | 214.0 | 290.2 |
| Comp. Ex. 2 | 0/100 | — | 282.5 |
| Comp. Ex. 3 | 50/50 | 217.0 | 232.4 |
| | | | 291.4 |

Note:
Tc: temperature of crystallization by cooling (°C.)
Tm: melting temperature (°C.)

TABLE 2

Water permeability of cellulose acetate membrane and sieving coefficient of myoglobin

| | CTA/CDA ratio | Water Permeability | | Myoglobin sieving coefficient | |
| --- | --- | --- | --- | --- | --- |
| | | b.t. | a.t. | b.t. | a.t. |
| Example 1 | 80/20 | 30 | 60 | 0.35 | 0.69 |
| Example 2 | 70/30 | 22 | 34 | 0.22 | 0.65 |
| Example 3 | 60/40 | 13 | 20 | 0.15 | 0.49 |
| Example 4 | 50/50 | 12 | 15 | 0.12 | 0.34 |
| Comp. Ex. 1 | 100/0 | 25 | 4 | 0.30 | 0.05 |
| Comp. Ex. 2 | 0/100 | 12 | 0 | 0.20 | 0 |
| unit | wt/wt | ml/m² hr mmHg | | — | |

Note:
b.t.: before high pressure steam sterilization treatment (121° C. for 20 minutes under ca. 1.3 atm)
a.t.: after high pressure steam sterilization treatment (121° C. for 20 minutes under ca. 1.3 atm)

EXAMPLE 5

A CTA/CDA=90/10 mixture (20% by weight), N-methylpyrrolidone (64% by weight) and triethylene glycol (16% by weight) were mixed to give a dope. The dope was discharged into a coagulating liquid from a tube-in-orifice spinneret. The discharge temperature was 130° C. and the temperature of the coagulating bath was 50° C. The coagulating bath contained an aqueous solution of N-methylpyrrolidone 24% by weight and triethylene glycol 6% by weight. Thereafter, the hollow fiber was subjected to a water bath at about 50° C., an about 50% glycerine bath and drying at about 100° C. before being wound up. The obtained hollow fiber had an inner diameter of about 200 μm and a wall thickness of about 15 μm. The hollow fiber was cut into 800, about 25 cm-long hollow fibers, and housed in a container made from a polycarbonate polymer. The fibers were determined for the initial sieving coefficient, sieving coefficient, permeation coefficient and property retention after a high pressure (ca. 1.3 atm) steam sterilization at 121° C. for 20 minutes. The results are shown in Table 3.

According to Table 3, the present invention is capable of producing a practical product which retains high permeation coefficient even after a high pressure steam sterilization. In addition, dispersion in terms of product properties was small and no bacterium was found in a sterilization test from the product after the sterilization treatment.

EXAMPLE 6

Using a mixture of CTA/CDA=80/20 by weight, a hollow fiber was manufactured in the same manner as in Example 5. The properties of the hollow fiber obtained are shown in Table 3.

As in Example 5, a sufficiently practical product was obtained and no bacterium was found in the product.

EXAMPLE 7

Using a mixture of CTA/CDA=70/30 by weight, a hollow fiber was manufactured in the same manner as in Example 5. The properties of the hollow fiber obtained are shown in Table 3.

Like Examples 5 and 6, a sufficiently practical product was obtained and no bacterium was found in the product.

COMPARATIVE EXAMPLE 4

Using a membrane made from CTA alone, a hollow fiber was manufactured in the same manner as in Example 5. The initial sieving coefficient, and sieving coefficient, permeation coefficient and property retention after a high pressure steam sterilization at 121° C. for 20 minutes are shown in Table 3.

The results show that the CTA membrane has an initial permeation coefficient of not less than $80 \times 10^{-5}$ cm/sec, whereas shows poor retention of property after a high pressure steam sterilization and great dispersion in the test results. The membrane was not practically usable.

TABLE 3

| | CDA content (%) | SC before treatment | | SC after treatment | |
|---|---|---|---|---|---|
| | | albumin | myoglobin | albumin | myoglobin |
| Example 5 | 10 | 0.02 | 0.23 | 0.05 | 0.75 |
| Example 6 | 20 | 0.01 | 0.13 | 0.06 | 0.68 |
| Example 7 | 30 | 0.03 | 0.10 | 0.07 | 0.59 |
| Comp. Ex. 4 | 0 | 0.05 | 0.33 | 0.02 | 0.03 |

Note:
SC = sieving coefficient
PC = permeation coefficient
% = based on CDA and CTA

EXAMPLE 8

A CTA, 60.8% in the combined acetic acid content, and a CDA, 55.0% in the combined acetic acid content, mixed at a weight ratio of 8/2 (19% by weight), N-methylpyrrolidone (64.8% by weight) and ethylene glycol (16.2% by weight) were mixed to give a dope. By the process shown in FIG. 2, the dope was discharged into a coagulating liquid of an aqueous solution of N-methyl-pyrrolidone 32% by weight and triethylene glycol 8% by weight from a tube-in-orifice spinneret (1) using a nitrogen gas inside the spinneret. In FIG. 2, the dope was discharged downward from the tube-in-orifice spinneret (1) under the following conditions:

Discharge velocity of dope: 2.0 ml/min
Dope temperature at discharge: 130° C.
Supply amount of nitrogen gas: 3.0 ml/min
Angle (6) between hollow fiber (5) and liquid surface (4) of coagulating bath: 60°
Distance (7) between spinneret (1) and liquid surface (4) of coagulating bath: 0.3 cm
Guide bar in coagulating bath: two stainless round rods (2, 3) coated with hard chromium with satin finish (2): 1.2 cm φ, distance (9) from the liquid surface (4): 2 cm (3): 0.8 cm φ,
distance (11) from the liquid surface (4): 4 cm
Angle (8) of hollow fiber (5) before and after guide (2): 134° Angle (10) of hollow fiber (5) before and after guide (3): 153° Temperature of coagulating bath: 35° C.
Distance of hollow fiber 5 passage through coagulating bath, from the entrance (18) to to exit (19) from the bath: 47 cm The hollow fiber was then subjected to a water bath and a glycerine bath and dried to give a hollow fiber having an outer diameter of about 250 μm and a wall thickness of about 20 μm. Using the obtained hollow fiber, water permeability, urea permeation coefficient, pore diameter and roundness were determined. The results are shown in Table 4.

EXAMPLE 9

Using the same dope as in Example 8, a hollow fiber was manufactured while passing a nitrogen gas inside the tube-in-orifice spinneret under the same conditions as in Example 8 by the use of three guide rolls (3, 12, 13) in a coagulating bath of FIG. 3. In FIG. 3, the three 1 cm diameter, stainless, round rod guides (3, 12, 13) with satin finish which had been coated with hard chromium were placed at 13 cm, 30 cm or 55 cm away from the in-liquid guide (2) and 8 cm (11), 8 cm (16) or 2 cm (17) beneath the coagulating liquid surface (4). The hollow fiber (5) passed through the in-liquid guide (2), changed the moving direction according to the above-mentioned three guides and ran in the air out the liquid surface at 60 cm away from the spinneret (1). The angle (8) of the hollow fiber (5) before and after the in-liquid guide (2) was 143° and the angles (10, 14, 15) before and after the three soaked guides were 155°, 167° and 174°, respectively. The hollow fiber obtained had an outer diameter of about 250 μm and a wall thickness of about 20 μm. Using 120 hollow fibers, the same module as in Example 1 was made and subjected to the same evaluation as in Example 8. The results are shown in Table 4.

EXAMPLE 10

Under the same conditions as in Example 8 except that the process of FIG. 4 was used, a cellulose acetate hollow fiber was manufactured. Using 120 hollow fibers obtained, the same module as in Example 1 was made and subjected to the same evaluation as in Example 8. The results are shown in Table 4.

EXAMPLE 11

Using the same dope as in Example 8, liquid paraffin inside the tube-in-orifice spinneret and the coagulating bath of FIG. 4, a hollow fiber was spun. The spinning conditions were as follows.

Discharge velocity of dope: 2.0 ml/min
Discharge velocity of liquid paraffin: 2.8 ml/min
Dope temperature at discharge: 130° C.
Concentration of coagulating bath: 40%
Temperature of coagulating bath: 35° C.
Guide bar in coagulating bath : FIG. 4

The hollow fiber obtained was then subjected to a water bath and a glycerine bath to give a hollow fiber having an outer diameter of about 250 μm and a wall thickness of about 20 μm. The properties of the hollow fiber were evaluated by the same method as in Example 8, the results of which are shown in Table 4.

TABLE 4

|  | Water permeability | | Urea permeation coefficien | | Myoglobin sieving coefficient | | Pore diameter (μm) | | Round- |
| --- | --- | --- | --- | --- | --- | --- | --- | --- | --- |
|  | b.t. | a.t. | b.t. | a.t. | b.t. | a.t. | b.t. | a.t. | ness |
| Ex. 8 | 30.8 | 60.7 | 97.7 | 77.6 | 0.32 | 0.58 | 54.4 | 96.6 | 83 |
| Ex. 9 | 27 | 58 | 100 | 76 | 0.30 | 0.61 | 53.8 | 97 | 86 |
| Ex. 10 | 28 | 48 | 95 | 70 | 0.29 | 0.52 | 51.6 | 93.2 | 70 |
| Ex. 11 | 25 | 45 | 98 | 69 | 0.31 | 0.49 | 55 | 95.2 | 85 |

Note:
b.t.: before high pressure steam sterilization treatment (121° C. for 20 minutes under ca. 1.3 atm)
a.t.: after high pressure steam sterilization treatment (121° C. for 20 minutes under ca. 1.3 atm)
roundness: The ratio of shorter diameter/longer diameter of the cross section of 200 hollow fibers randomly picked up from the 800 hollow fibers used for the module was determined and the average value was taken as the roundness.

By mixing a CTA and a CDA at an appropriate ratio, crystallization or orientational crystallization of each component due to a high pressure steam sterilization can be avoided and a cellulose acetate membrane with improved water permeability and sieving coefficient of myoglobin after a high pressure steam sterilization can be obtained.

What is claimed is:

1. A cellulose acetate membrane comprising a mixture of a cellulose triacetate and a cellulose diacetate, wherein both the cellulose diacetate and the cellulose triacetate have an average combined acetic acid content of at least 52%, said membrane has an improved heat stability, and when said membrane is subjected to a differential thermal analysis, said membrane does not substantially exhibit a melting peak of cellulose diacetate, but substantially exhibits a melting peak of the cellulose triacetate;

said membrane satisfying at least one of the following requirements:

(1) ratio of the water permeability of the membrane after a high pressure steam treatment of said membrane to that before the treatment is of not less than 0.9, (2) a ratio of the myoglobin sieving coefficient of the membrane after a high pressure steam treatment of said membrane to that before the treatment is of not less than 0.9, and (3) a ratio of the urea permeation coefficient of the membrane after treatment a high pressure steam treatment of said membrane that before the treatment is of not less than 0.65.

2. The membrane of claim 1, satisfying at least one of the following requirements:

(1) a ratio of the water permeability of the membrane after a high pressure steam treatment of said membrane to that before the treatment is of not less than 1.1, and (2) a ratio of the myoglobin sieving coefficient of the membrane after a high pressure steam treatment of said membrane to that before the treatment is of not less than 1.1.

3. The membrane of claim 1, wherein the mixture has an average combined acetic acid content of 56–61.5%.

4. The membrane of claim 1, wherein the cellulose triacetate and the cellulose diacetate are independently prepared.

5. The membrane of claim 1, wherein the cellulose diacetate has an average combined acetic acid content of 52–58% and the cellulose triacetate has an average combined acetic acid content of 60–62%.

6. The membrane of claim 1, having pores of 2–300Å in diameter and a porocity of 50–90%.

7. The membrane of claim 1, wherein the mixture includes a weight ratio of cellulose triacetate to cellulose diacetate of 99/1 to 50/50.

8. The membrane of claim 1, wherein the mixture includes a weight ratio of cellulose triacetate to cellulose diacetate of 90/10 to 50/50.

9. A cellulose acetate membrane comprising a mixture of a cellulose triacetate and a cellulose diacetate, wherein said membrane has pores of 20–300Å in diameter and a porosity of 50–90%, and both the cellulose diacetate and the cellulose triacetate have an average combined acetic acid content of at least 52%.

10. The membrane of claim 9, wherein the mixture comprises a cellulose diacetate having a combined acetic acid content of 52–58% and a cellulose triacetate having a combined acetic acid content of 60–62%.

11. The membrane of claim 9, wherein the mixture includes a weight ratio of cellulose triacetate to cellulose diacetate of 90/10 to 50/50.

12. A hemodialyser comprising a cellulose acetate membrane, said membrane comprising:

a mixture of a cellulose triacetate and a cellulose diacetate, wherein both the cellulose diacetate and the cellulose triacetate have an average combined acetic acid content of at least 52%, said membrane has an improved heat stability, and when said membrane is subjected to a differential thermal analysis, said membrane does not substantially exhibit a melting peak of cellulose diacetate, but substantially exhibits a melting peak of the cellulose triacetate, said membrane satisfying at least one of the following requirements:

(1) a ratio of the water permeability of the membrane after a high pressure steam treatment of said membrane to that before the treatment is of not less than 0.9, (2) a ratio of the myoglobin sieving coefficient of the membrane after a high pressure steam treatment of said membrane to that before the treatment is of not less than 0.9, and (3) a ratio of the urea permeation coefficient of the membrane after treatment a high pressure steam treatment of said membrane that before the treatment is of not less than 0.65; and a container having an inlet and an outlet, wherein said container houses said membrane.

13. The hemodialyzer of claim 12, wherein the mixture comprises a cellulose diacetate having a combined acetic acid content of 52–58% and a cellulose triacetate having a combined acetic acid content of 60–62%.

14. The hemodialyzer of claim 12 which is sterilized.

15. The hemodialyzer of claim 12, wherein the mixture includes a weight ratio of cellulose triacetate to cellulose diacetate of 90/10 to 50/50.

16. A hemodialyzer comprising a hollow fiber membrane of a homogeneous mixture, said mixture comprising a cellulose diacetate and a cellulose triacetate, wherein both the cellulose diacetate and the cellulose triacetate have an average combined acetic acid content of at least 52%, the cellulose diacetate is present in an amount of 1–50% by weight based on the total weight of the cellulose diacetate and the cellulose triacetate, said membrane has a sieving coefficient of albumin after a high pressure steam treatment at 121° C. for 20 minutes of not more than 0.1, and said membrane has a sieving coefficient of myoglobin of not less than 0.1.

17. The hemodialyzer of claim 16, wherein the mixture comprises a cellulose diacetate having a combined acetic acid content of 52–58% and a cellulose triacetate having a combined acetic acid content of 60–62%.

18. The hemodialyzer of claim 16, wherein the hollow fiber has an outer diameter of 180–320 μm, an inner diameter of 150–250 μm, a fiber thickness of 10–50 μm, and fine pores of 20–300 angstroms.

* * * * *